(12) United States Patent
Iyer et al.

(10) Patent No.: US 7,747,652 B2
(45) Date of Patent: Jun. 29, 2010

(54) STRUCTURED DATA STORAGE

(75) Inventors: Raju R. Iyer, Redmond, WA (US);
Rajendra H. Vishnumurty, Bellevue, WA (US); Sudin Bhat, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 262 days.

(21) Appl. No.: 11/326,358

(22) Filed: Jan. 4, 2006

(65) Prior Publication Data

US 2007/0156735 A1 Jul. 5, 2007

(51) Int. Cl.
*G06F 7/00* (2006.01)
(52) U.S. Cl. .................. 707/797; 707/951; 707/956; 715/853; 715/963
(58) Field of Classification Search .................. None
See application file for complete search history.

(56) References Cited

U.S. PATENT DOCUMENTS

| | | | | |
|---|---|---|---|---|
| 5,751,962 | A * | 5/1998 | Fanshier et al. | 709/223 |
| 5,892,510 | A * | 4/1999 | Lau et al. | 715/866 |
| 5,893,074 | A | 4/1999 | Hughes et al. | 705/8 |
| 5,907,490 | A | 5/1999 | Oliver | 364/468.05 |
| 6,092,076 | A * | 7/2000 | McDonough et al. | 707/102 |
| 6,282,547 | B1 * | 8/2001 | Hirsch | 707/102 |
| 6,314,434 | B1 | 11/2001 | Shigemi et al. | 707/203 |
| 6,370,537 | B1 * | 4/2002 | Gilbert et al. | 707/101 |
| 6,516,320 | B1 | 2/2003 | Odom et al. | 707/101 |
| 6,516,390 | B1 | 2/2003 | Chilton et al. | 711/138 |
| 6,801,229 | B1 * | 10/2004 | Tinkler | 715/853 |
| 2003/0088656 | A1 | 5/2003 | Wahl et al. | 709/223 |
| 2003/0144969 | A1 | 7/2003 | Coyne | 705/400 |
| 2003/0158859 | A1 | 8/2003 | Lasensky et al. | 707/104.1 |
| 2003/0217117 | A1 | 11/2003 | Dan et al. | 709/218 |
| 2004/0003351 | A1 * | 1/2004 | Sommerer et al. | 715/517 |

(Continued)

FOREIGN PATENT DOCUMENTS

EP    1 589 442 A3    10/2005

(Continued)

OTHER PUBLICATIONS

Jeffrey Heer, Stuart K. Card, and James A. Landay, "Prefuse: A toolkit for interactive information visualization", CHI 2005, Apr. 2-7, 2005, p. 421-430.*

(Continued)

*Primary Examiner*—Neveen Abel Jalil
*Assistant Examiner*—Vei-Chung Liang
(74) *Attorney, Agent, or Firm*—Merchant & Gould, P.C.

(57) ABSTRACT

Backend data is received from a computer program product such as a hard disk or other long term data storage. The backend data is structured using nodes that are associated with a unique identifier such as a GUID. The nodes are addressable using the unique identifier, and backend data items are associated with corresponding addressable nodes such that the backend nodes can be quickly accessed. Front-end data can be received from a computer program product such as a hard disk or other long term data storage. The front-end data is structured using nodes that are associated with a unique identifier such as a GUID. The nodes are addressable using the unique identifier, and front-end data items are associated with corresponding addressable nodes such that the front-end nodes can be quickly accessed.

17 Claims, 3 Drawing Sheets

U.S. PATENT DOCUMENTS

| | | | |
|---|---|---|---|
| 2004/0083238 A1 | 4/2004 | Louis et al. | 707/200 |
| 2004/0143475 A1 | 7/2004 | Kilburn et al. | 705/8 |
| 2004/0205566 A1* | 10/2004 | Aggarwal et al. | 715/513 |
| 2004/0218203 A1 | 11/2004 | Mastie et al. | 358/1.13 |
| 2004/0255265 A1 | 12/2004 | Brown et al. | 717/101 |
| 2004/0267832 A1 | 12/2004 | Wong et al. | 707/200 |
| 2005/0055665 A1 | 3/2005 | Woo et al. | 717/101 |
| 2005/0120030 A1* | 6/2005 | Varpela et al. | 707/100 |
| 2006/0044319 A1* | 3/2006 | Molesky et al. | 345/581 |
| 2006/0248117 A1 | 11/2006 | Bell et al. | 707/104.1 |

FOREIGN PATENT DOCUMENTS

WO    WO 2005/071564 A1    8/2005

OTHER PUBLICATIONS

Emmanuel Pietriga, "A Toolkit for Addressing HCI issues in Visual Language Environments", Proceedings of the 2005 IEEE Symposium on Visual Languages and Human-Centric Computing, Sep. 20-24, p. 145-152.*

Primavera, Primavera Project Planner, http://www.milestoneuk.com/uploads/products/pdfs/projectplanner_low.pdf, copyright 2004.*

Teresa Stover, Microsoft Office Project 2003 Inside Out, Oct. 1, 2003, Microsoft Press.*

"CLEO III Data Storage," by M. Lohner et al., Retrieved from the Internet: http://w4.lns.cornell.edu/~cdj/publications/conferences/chep00/datastorage.pdf, Retrieved on Oct. 5, 2005, 5 pgs.

"Data Management for XML: Research Directions," by Jennifer Widom, Retrieved from the Internet: http://ce.sejong.ac.kr/~shindk/PAPERS/XML/xml-whitepaper.pdf, Retrieved on Oct. 5, 2005, 10 pgs.

"PRJ: Description of the MPX Project File Exchange Format," Retrieved from the Internet: http://support.microsoft.com/default.aspx?scid=kb; en-us; 270139, Retrieved on Oct. 5, 2005, 10 pgs.

Search Report mailed May 8, 2009, issued in EP Application No. 07709574.3.

* cited by examiner

STRUCTURED DATA STORAGE

BACKGROUND

Computer systems typically comprise short-term memory and long-term memory. Short-term memory typically uses dynamic RAM, which typically provides quick access to data stored within the RAM. Long-term memory, such as that provided by a hard disk, provides relatively slow access to stored data, but normally retains the data even after power has been turned off. Accordingly, computers use data stored in short-term memory to manipulate and process the data, and use long-term memory to store the data when the data is not being processed.

Users (including various computer processes) typically save the data to disk when finished working with the program and data. Also, users load the stored data from the disk to short-term memory so that the data can be viewed and/or manipulated. However, as the amount of data becomes more voluminous and complex, these operations can require considerable amounts of time to save and to load.

SUMMARY

This summary is provided to introduce a selection of concepts in a simplified form that are further described below in the Detailed Description Section. This summary is not intended to identify key features or essential features of the claimed subject matter, nor is it intended to be used as an aid in determining the scope of the claimed subject matter.

According to aspects of various described embodiments, implementations are provided for a method for implementing structured data storage. Backend data is "core" or "backbone" information that is typically central to the task that a user is trying to accomplish. Backend data can be received from a computer program product such as a hard disk or other long term data storage. The backend data is structured using nodes that are associated with a unique identifier such as a GUID. The nodes are addressable using the unique identifier, and backend data items are associated with corresponding addressable nodes such that the backend nodes can be quickly accessed. Front-end data is typically more related to how the backend data is obtained, used, and presented. Front-end data can be received from a computer program product such as a hard disk or other long term data storage. The front-end data is structured using nodes that are associated with a unique identifier such as a GUID. The nodes are addressable using the unique identifier, and front-end data items are associated with corresponding addressable nodes such that the front-end nodes can be quickly accessed.

According to another aspect, a system for implementing structured data storage includes a file writer for saving backend data from a computer program to a computer program product, a backend data loader for receiving backend data from a computer program product, a front-end data loader for receiving front-end data from a computer program product, and a display module for displaying the particular backend data item in response to received front-end data for displaying the particular data item.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Embodiments may be implemented as a computer process, a computer system (including mobile hand-held computing devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Figure 1:
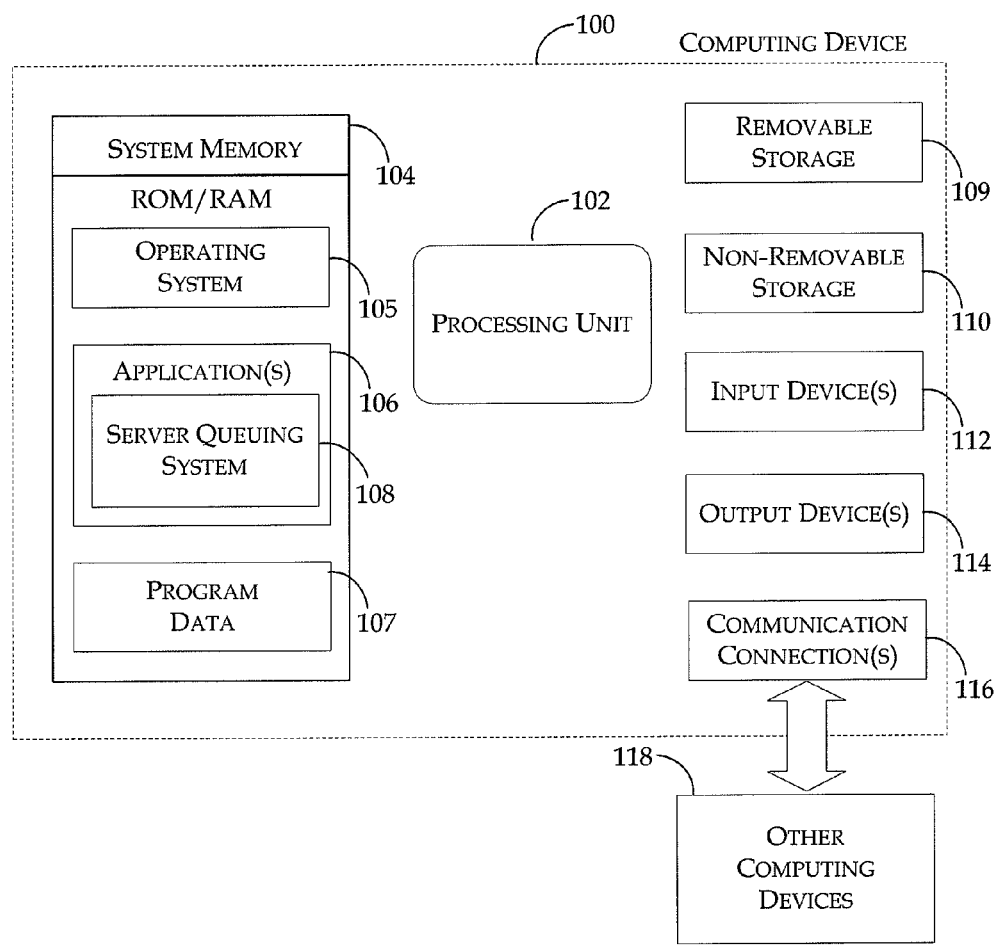
FIG. 1 illustrates an example computing device that may be used according to an embodiment.

FIG. 1 illustrates an example computing device that may be used according to an embodiment. The example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In accordance with this embodiment, a server queuing system 108, which is described in detail below, is typically implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100 using file writers and loaders. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large-scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
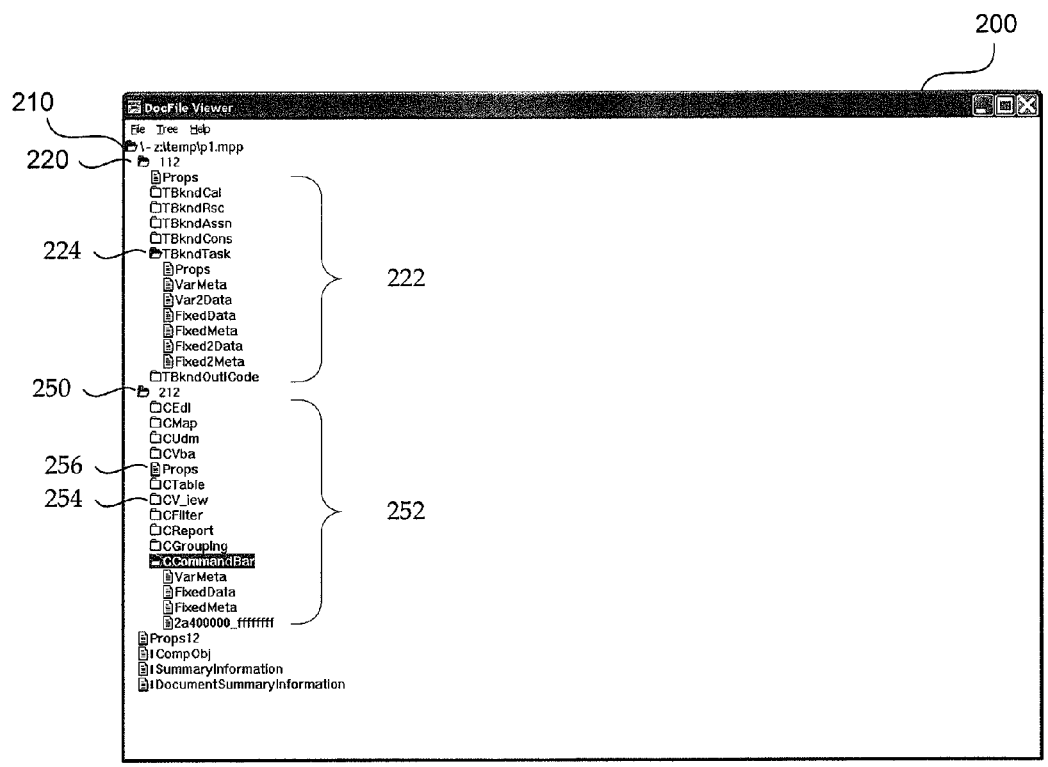
FIG. 2 illustrates an example data storage format for structured data storage.

FIG. 2 illustrates an example data storage format for structured data storage. Window 200 comprises an example file structure that is used in structured data storage. Node 210 is a root node, which typically comprises subordinate nodes in a tree-like structure. For example, node 210 comprises node 220 (which is used to store "backend" data) and node 250 (which is used to store "front-end" data). Additional subordinate (or "child") nodes can be used to store attributes and other information that are related to a superior (or "parent") node.

Each node is typically associated with a GUID (e.g., a unique identifier) that allows nodes to be uniquely specified and addressed. As an example, a GUID for a node can be "hashed" to provide an address for a unique key such that the physical address of the node can be quickly located. Child nodes can be related to parent nodes by associating any child node GUIDs with a parent node (so that the resulting structure can be, for example, traversed by following associated links). The nodes can contain information for accessing elements within fixed-length and variable-length structures. Accordingly, the resulting structure can be quickly accessed to implement efficient searching and loading of data.

Saving and retrieving information to and from a disk is typically time consuming, and is usually at least an inconvenience for the user who often has to wait for the information to be loaded. Storing the data in a structured format allows data to be efficiently received by a program and relatively quickly presented to a user requesting the data through the program interface.

As demonstrated in window 200, the data to be manipulated by a user of an application program is organized as backend data and front-end data. The application program can be a program such as a project management tool. As such, a user can manage a project by using both the back-end data and the front-end data, which are typically entered by the user, manipulated and organized using the program, and stored on disk for later retrieval. The data is structured such that a program accessing the data typically loads the backend information first, followed by the front-end information (which typically is used for interfacing with the backend data).

Backend data (such as represented by node 220) is "core" or "backbone" information that is typically central to the task that a user is trying to accomplish. (In comparison, front-end data, discussed below, is more related to how the backend data is obtained, used, and presented). For example, backend data of a project management program comprises information (typically stored as child nodes 222 of parent node 220) such as task name, resources calendars, assignments, lookup tables, constraints, and the like.

Task names can comprise a name (or number) of a task that is associated with a project. Resources can comprise people (or other resources) that are associated with the task. Calendars can be used to specify dates and/or times for the task, assignments can be used to associate resources with tasks. Lookup tables can be used to store, for example, heuristics or other types of organized knowledge related to accomplishing the task. Constraints can be used to limit when, for example, certain resources are available.

The contents of node 224 (related to "tasks") have been exposed to show further child nodes. The child nodes can be used to represent fixed data for a given property, table indexes, actual data (such as the task name), GUID-based hash location, and indexes to data (from hashed locations or other indexes). Both the GUID hash and indexes to child nodes of back-end data can be pre-computed and then stored such that the pre-computed hashes and indexes can be used (without substantial computation, such as computing the hash function for the GUID) as the data is being loaded by the program.

Front-end data (such as represented by node 250) is more related to how the backend data is obtained, used, and presented. For example, front-end information used by a project management program comprises information (typically stored as child nodes 252 of parent node 250) information such as external data links, import/export map information, forms, macro language programs, front-end tables, views, and filters, project reports, groups, toolbars, custom field information and the like.

For example, external data links, import map information (e.g., from a spread sheet), and forms can be used to obtain backend data. Macro language programs, filters, and groups can be used to manipulate the obtained backend data. Forms, tables, filters, project reports, groups, toolbars, and custom field information can be used to control how the backend data is displayed. (Combinations of the above functions can be accomplished, such as manipulating and displaying data by filtering.)

The various views (e.g., the front-end information for displaying backend data) can be stored in node 254. Which of the views are visible (at the time the program is closed, for example) can be stored in node 256. The information stored in nodes 254 and 256 are used by the program to determine which view was last used such that the program can quickly search for and locate the particular backend data that was last being used by the user. The program can thus quickly restore the view because (for example) the backend data has already been loaded into memory, and the related hashes of the GUIDs and related indexes have been pre-computed for quick referencing.

Figure 3:
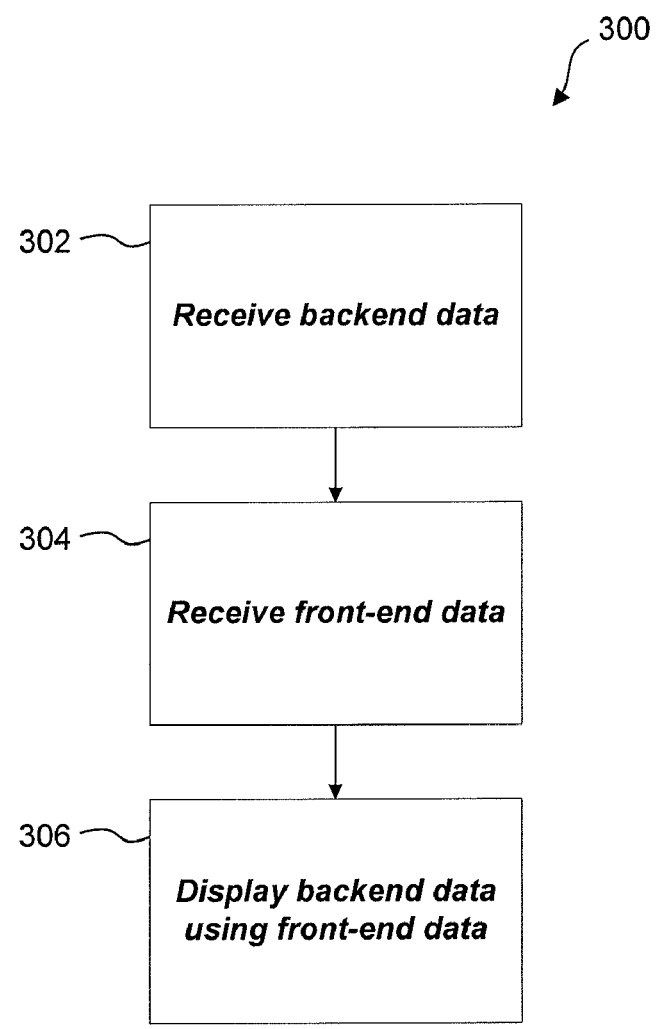
FIG. 3 illustrates an example operational flow 300 for structured data storage.

FIG. 3 illustrates an example operational flow 300 for structured data storage. At operation 302, backend data is received. The backend data can be received from a computer program product such as a hard disk or other long term data storage. The backend data is structured using nodes that are associated with a unique identifier such as a GUID. The nodes are addressable using the unique identifier, and backend data items are associated with corresponding addressable nodes such that the backend nodes can be quickly accessed.

The backend data items can be located using a pre-computed hash value for the data item. The pre-computed hash values can be located with other backend data. Additionally, the backend data items can be located using pre-computed and predetermined indexes for the data item. The pre-computed indexes can be located with other backend data.

At operation 304, front-end data is received. The front-end data can be received from a computer program product and is typically stored in association with the backend data. The backend data and front-end data can also be sibling nodes The front-end data is structured using nodes that are associated with a unique identifier such as a GUID. The nodes are addressable using the unique identifier, and front-end data items are associated with corresponding addressable nodes such that the front-end nodes can be quickly accessed.

The front-end data also comprises information for displaying a particular backend data item of received backend data. The display information can comprise information such as display information related to a view of a particular backend data item when last viewed by a user.

The front-end data items can be located using a pre-computed hash for the data item. The pre-computed hash can be located with other backend data. Additionally, the front-end data items can be located using pre-computed and predetermined indexes for the data item. The pre-computed indexes can be located with other front-end data.

At operation 306, backend data is displayed using information from the front-end data. In general, the front-end information describes how the backend data can be displayed. For example, the front-end information can store information related to a view of backend data as last viewed by a user. Also, in various embodiments, the backend data can be displayed before loading all of the front-end data. Additionally, the receiving order of the front-end data can be set by heuristics, such as "load in order of most recently viewed," and "load front-end data that can be navigated to by the last view saved."

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer-implemented method for receiving structured data, comprising:
    receiving backend data from a computer program product, wherein the backend data is structured using nodes, wherein the nodes are associated with a unique identifier and the nodes are addressable using the unique identifier, and wherein particular back-end data items are associated with corresponding addressable nodes;
    wherein the backend data is core information relating to project management, the core information including tasks, task constraints, calendar information, and resource assignments;
    after receiving the backend data, receiving front-end data from a computer program product; wherein the front-end data is structured using nodes, wherein the nodes are associated with a unique identifier and the nodes are addressable using the unique identifier, wherein a receiving order of the front-end data is set by heuristics,
    wherein the front-end data comprises information for displaying a particular backend data item of the received backend data, the front-end data including forms, macros, filters, toolbars, project reports, and views and information related to a last used view of project management core information; wherein the views are stored in a first view node and wherein the last used view is stored in a second view node;
    wherein the backend data is stored within a backend node and the front-end data is stored within a front-end node; wherein the backend node and the front-end node are stored at a same level in a hierarchy; wherein the backend data and the front-end data are children of a parent node within the hierarchy; wherein the first view node and the second view node are stored within a view node that is a child of the front-end node;
    wherein child nodes of the front-end data and the backend data store attributes relating to a parent node; and
    displaying the particular backend data item in response to received front-end data for displaying the particular data item; wherein the front-end data describes how to display the particular backend data.

2. The method of claim 1, wherein the received front-end data for displaying the particular backend data item is addressed using a unique identifier that is associated with the received front-end data for displaying the particular data item.

3. The method of claim 1, wherein the displayed particular backend data item is located using a pre-computed hash for the data item, wherein the pre-computed hash is located within the received backend data.

4. The method of claim 1, wherein the received particular backend data items are addressable using pre-computed hash function results that are stored in the received backend data.

5. The method of claim 1, wherein the received particular backend data items are addressable using pre-computed indexes that are stored in the received backend data.

6. The method of claim 1, wherein the front-end data further includes external data links, import and export map information, front-end tables, groups, and custom field information.

7. A system for receiving structured data, comprising:
a display;
a processor and a computer-readable storage medium;
an operating environment stored on the computer-readable medium and executing on the processor; and
a file writer operating under the control of the operating environment and configured for saving backend data from a computer program to a computer program product,
wherein the backend data is structured using nodes, wherein the nodes are associated with a unique identifier and the nodes are addressable using the unique identifier, and wherein particular back-end data items are associated with corresponding addressable nodes, and wherein the backend data comprises information related to tasks, calendar information, and resource assignments;
and for saving front-end data, wherein the front-end data is structured using nodes, wherein the nodes are associated with a unique identifier and the nodes are addressable using the unique identifier, and wherein the front-end data comprises information for displaying a particular backend data item of the received backend data; and the front-end data comprises information related to a last used view of backend data;
wherein the backend data is core information relating to a project; wherein the backend data is stored within a backend node and the front-end data is stored within a front-end node; wherein the backend node and the front-end node are stored at a same level in a hierarchy; wherein the backend data and the front-end data are children of a parent node within the hierarchy; wherein the first view node and the second view node are stored within a view node that is a child of the front-end node; wherein child nodes of the front-end data and the backend data store attributes relating to a parent node;
a backend data loader operating under the control of the operating environment and configured for receiving backend data from a computer program product;
a front-end data loader operating under the control of the operating environment and configured for receiving front-end data from a computer program product that is loaded according to heuristics; and
a display module operating under the control of the operating environment and configured for displaying the particular backend data item on the display in response to received front-end data for displaying the particular data item.

8. The system of claim 7, wherein the received front-end data for displaying the particular backend data item is addressed using a unique identifier that is associated with the received front-end data for displaying the particular data item.

9. The system of claim 7, wherein the displayed particular backend data item is located using a pre-computed hash for the data item, wherein the pre-computed hash is located within the received backend data.

10. The system of claim 7, wherein the received particular backend data items are addressable using pre-computed hash function results that are stored in the received backend data.

11. The system of claim 7, wherein the received particular backend data items are addressable using pre-computed indexes that are stored in the received backend data.

12. The system of claim 7, wherein the front-end data further comprises external data links, import and export map information, front-end tables, groups, and custom field information.

13. A system for receiving structured data, comprising:
means for receiving backend data from a computer program product, wherein the backend data is structured using nodes, wherein the nodes are associated with a unique identifier and the nodes are addressable using the unique identifier, and wherein particular back-end data items are associated with corresponding addressable nodes; and the backend data comprises information related to project management of tasks;
means for receiving front-end data from a computer program product that is loaded according to heuristics; wherein the front-end data is structured using nodes, wherein the nodes are associated with a unique identifier and the nodes are addressable using the unique identifier, and wherein the front-end data comprises information for displaying a particular backend data item of the received backend data, the front-end data including a last used view of backend data; wherein the backend data is stored within a backend node and the front-end data is stored within a front-end node; wherein the backend node and the front-end node are stored at a same level in a hierarchy; wherein the backend data and the front-end data are children of a parent node; wherein child nodes of the front-end data and the backend data store attributes relating to a parent node; and
means for displaying the particular backend data item in response to received front-end data for displaying the particular data item.

14. The system of claim 13, wherein the received front-end data for displaying the particular backend data item is addressed using a unique identifier that is associated with the received front-end data for displaying the particular data item.

15. The system of claim 13, wherein the received particular backend data items are addressable using pre-computed hash function results that are stored in the received backend data.

16. The system of claim 13, wherein the received particular backend data items are addressable using pre-computed indexes that are stored in the received backend data.

17. The system of claim 13, wherein the front-end data further includes forms, macros, filters, toolbars, and project reports.

* * * * *